United States Patent [19]
Ono

[11] 3,745,544
[45] July 10, 1973

[54] APPARATUS FOR MEASURING ANGLES
[75] Inventor: Giichiro Ono, Tokyo, Japan
[73] Assignee: Ono Sokki Co., Ltd., Tokyo, Japan
[22] Filed: Oct. 26, 1971
[21] Appl. No.: 192,199

[30] Foreign Application Priority Data
Nov. 5, 1970  Japan.............................. 45/97363

[52] U.S. Cl........... 340/206, 235/92 MP, 324/83 D, 340/271
[51] Int. Cl........................................... G08c 19/16
[58] Field of Search........................... 340/206, 271; 235/92 MP; 324/83 D

[56] References Cited
UNITED STATES PATENTS
2,987,710  6/1971  Oberle ................................ 340/206
3,098,152  7/1963  Mathes .............................. 340/271

*Primary Examiner*—John W. Caldwell
*Assistant Examiner*—Robert J. Mooney
*Attorney*—Stowell & Stowell

[57] ABSTRACT

Apparatus for digitally measuring the angle of rotation of a shaft is provided including first, second, third and fourth discs mounted for rotation on a common shaft or axis and cooperating first, second, third and fourth electromagnetic pickups mounted facing each of the exterior circumferences of the first, second, third and fourth discs, some of the pickups are fixed with respect to their complementary rotating discs and the others are rotated an amount corresponding to the rotating angle to be measured and circuit means including pulse signal generators, counters, gates and decoders for digitally measuring the angle of movement of the rotatably mounted electromagnetic pickups.

4 Claims, 10 Drawing Figures

APPARATUS FOR MEASURING ANGLES

The invention relates to the apparatus for digitally measuring an angle which rotates from the state of repose or a physical amount which can be converted into such a rotating angle.

For example, the Bourdon's tube for measuring pressure is so constructed that the pressure being measured is transferred to the fluid inside the tube, thereby the central top end of the tube is turned from the state of repose and thus the pressure can be measured by measuring the rotating angle of the central top end of the tube.

Also, the known automatic weighing machine for measuring the weight of heavy materials is so constructed that the weight of a subject being measured can be obtained from the rotating angle of the bar which turns in accordance with the difference between the weight of the subject being measured and the reference weight being used.

The invention will be more particularly described in reference to the accompanying drawings wherein.

Figure 1:
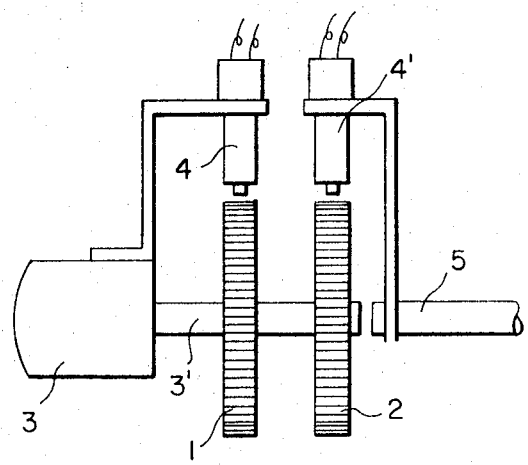
FIG. 1 illustrates a sectional view of the principal structure of conventional apparatus for measuring angles.

In the art of measuring a rotating angle digitally, such an apparatus as shown, for example, in FIG. 1 has been invented and put into practical use.

Figure 2:
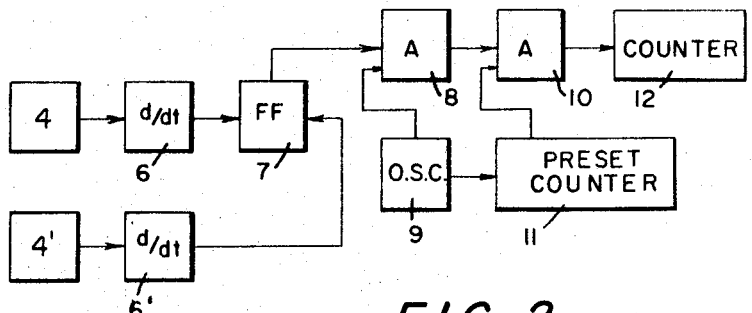
FIG. 2 illustrates in block form the circuit for processing signals detected by the said apparatus.

Referring now to FIG. 1, 1 and 2 are rotating discs of a magnetic material having the same number of toothed protuberances on the exterior circumference of each of them. 3 is a motor, on the rotary shaft 3' of which the said rotating discs 1 and 2 are mounted. 4 is an electromagnetic pickup fixed on a proper supporter (i.e., it is in this case fixed on the housing of the motor 3 by means of a bracket as shown in the drawing); the said electromagnetic pickup comprises a detecting coil and a permanent magnet whose magnetic flux intersects the said rotating disc 1 as part of the magnetic path. 4' is a moving electromagnetic pickup having the same structure as the said fixed electromagnetic pickup 4; the moving electromagnetic pickup 4' is mounted on a rotary shaft 5 through a bracket; and the said rotary shaft 5 has the same center as the rotary shaft 3' on which the said rotating discs 1 and 2 are mounted but can rotate, regardless of the rotary shaft 3'.

When turning the said rotating discs 1 and 2 at a constant angular velocity by means of the motor 3, the magnetic reluctance of the magnetic path changes in accordance with the toothed protuberances of the exterior circumference of each of the rotating discs 1 and 2, causing the density of the magnetic flux intersecting each detecting coil of the electromagnetic pickups 4 and 4' to change. Thereby, AC signals having the same frequency and constant phase difference can be taken out of the said electromagnetic pickups 4 and 4'.

Suppose the number of revolutions of the said rotating disc 1 and 2 is $n$/minute and the number of toothed protuberances on the exterior circumference of each of the rotating discs 1 and 2 is Z, the frequency $f$ of AC signals taken out of the electromagnetic pickups 4 and 4' can be calculated by the formula:

$$f = nZ/60 \text{ (Hertz)} \tag{1}$$

When the projected amplitude $\Delta$ of the electromagnetic pickups 4 and 4' against the plane at right angles to the rotary shaft 3' of the said motor 3 is considered.

$$\Delta = (2\pi/Z)(m + \epsilon) \tag{2}$$

where $m = 0, 1, 2, \ldots$ and $0 < \epsilon < 1$, the phase difference between the output AC signals of the electromagnetic pickups 4 and 4' is $2\pi\epsilon$.

When turning the rotary shaft 5 in accordance with the revolution of a subject being measured, the said moving electromagnetic pickup 4' also rotates around the rotating disc 2. Therefore, since the said projected amplitude $\Delta$ of the electromagnetic pickups 4 and 4' changes, the phase difference between the output AC signals of the electromagnetic pickups also changes accordingly. Thus, the rotating angle of the rotary shaft 5, i.e., the rotating angle of the subject being measured, can be obtained by measuring the change of the phase difference.

Referring to FIG. 2, illustrated in block form is the circuit for measuring the phase difference described in the preceding paragraph. In the drawing, 4 and 4' are fixed and moving electromagnetic pickups illustrated and described in FIG. 1. 6 and 6' are differentiation circuits. 7 is a flip-flop circuit. 8 is the first gate circuit. 9 is a reference pulse oscillator. 10 is the second gate circuit. 11 is a preset counter. 12 is a counter.

The output AC signals of the said electromagnetic pickups 4 and 4' are individually differentiated with the differentiation circuits 6 and 6', of which, for example, the positive pulse signals only are taken out and fed to the flip-flop circuit 7 to form a gate control signal and thereby the make and break of the first gate circuit 8 are controlled.

For example, the gate control signal of the output control signals of the flip-flop circuit 7 which matches the output pulse signal of the differentiation circuit 6 can put the first gate circuit 8 into a conducting state, the gate control signal matching the output pulse signal of the differentiation circuit 6' can break the first gate circuit 8 and allow the output pulse signals of the reference pulse oscillator 9 to pass through the first gate circuit 8 while it is in a conducting state.

Suppose the oscillation frequency of the reference pulse oscillator 9 is $fc$, the number of the reference pulse signals $M$ passing through the first gate circuit 8 while it is in the first conducting state can be calculated by the formula:

$$M = (fc/f) \cdot \epsilon \tag{3}$$

When substituting the formula (1) for the formula (3) above, $$M = 60/nZ \cdot fc \cdot \epsilon \quad (4)$$

As can be seen by the formula (4) above, the number of reference pulses $M'$ passing through the first gate circuit 8 while it is in the first conducting state is proportional to the amplitude of the electromagnetic pickups 4 and 4' within as much as one pitch determined by the number of toothed protuberances $Z$, i.e., within a range of $1/Z$ of one turn centering the rotary shaft 3' of the motor 3. Therefore, the rotating angle of the rotary shaft 5 can be measured by computing the number of reference pulses passing through the first gate circuit 8. However, since the formula (4) above includes the number of revolutions, $n$, of the rotating discs 1 and 2, when the number of revolutions of the motor 3 fluctuates, the number of reference pulses passing through the first gate circuit 8 is also changed, resulting in errors in the measurement. Also, the formula (4) contains the number of toothed protuberances, $Z$, on the exterior circumference of each of the rotating discs 1 and 2. Because of this, mechanical unevenness of the toothed protuberances may cause errors in the measurement.

In order to minimize these errors and increase measuring accuracy, the apparatus is constructed as follows. That is, with the apparatus, the second gate circuit 10 is put into a conducting state as long as the preset time of the preset counter 11 and the pulse signals which passed through the first gate circuit 8 are caused to pass through the second gate circuit 10. Suppose the preset time of the preset counter 11 is $T$ seconds, the number of pulses $M'$ passing through the second gate circuit in $T$ seconds can be calculated by the formula:

$$M' = f \cdot T \cdot M \quad (5)$$

When substituting the formula (3) for the above formula (5), $$M' = fc \cdot \epsilon \cdot T \quad (6)$$

Suppose the number of reference pulses from the clock pulse oscillator computed by the preset counter 11 in $T$ seconds is $F$, $$F = T \cdot fc \quad (7)$$

This can be substituted by the formulas (6) and (7) as follows:

$$M' = F \cdot \epsilon \quad (8)$$

As can be seen by the formula (8) above, the number of pulses $M'$ passing through the second gate circuit 10 in the number of reference pulses $F$ is proportional to the phase difference $\epsilon$ within one pitch of the toothed protuberances on the exterior circumference of each of the rotating disc 1 and 2. Since the formula (8) does not contain both the number of revolutions $n$ and that of toothed protuberances $Z$ of the rotating discs 1 and 2, there is no possibility of causing measuring errors due to the variation in $n$ and/or mechanical unevenness of the toothed protuberances. Therefore, the rotating angle of the rotary shaft 5 within one pitch of the toothed protuberances on the exterior circumference of each of the rotating discs 1 and 2 can be measured by counting the number of pulses passing through the second gate circuit 10 with the counter 12 after selecting $F$ value properly.

As can be seen by the description hereinbefore, the conventional apparatus for measuring angles as shown in FIGS. 1 and 2 is so limited in its measuring capabilities that it can measure micro angular changes only within one pitch determined by the number of toothed protuberances on the exterior circumference of a rotating disc.

The object of the invention relates to the materialization of apparatus for measuring angles with high accuracy capable of covering a wider angle (maximum 2 $\pi$ in a mechanical angle) over the plural number of pitch of the toothed protuberances on the exterior circumference of a rotating disc.

Figure 4:
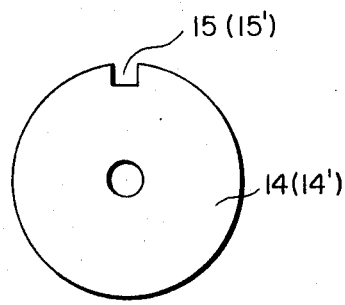
FIG. 4 illustrates a front view of one example of the structure of the principal element according to the invention.
Figure 3:
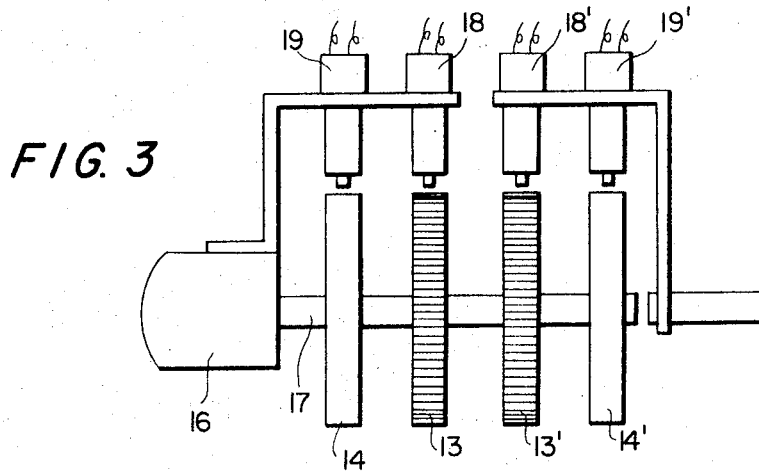
FIG. 3 illustrates a sectional view of the principal structure of one of preferred embodiments according to the invention.

FIG. 3 illustrates a sectional view of the principal structure of one of preferred embodiments according to the invention. Referring now to the drawing in more detail, 13 and 13' are rotating discs of a magnetic material, each exterior circumference thereof has the same number of toothed protuberances. 14 and 14' are rotating discs of a magnetic material, each exterior circumference thereof has a U-shape cut-out 15 (and 15') as shown in FIG. 4 (it can be replaced by a non-magnetic material if a small magnetic is used in place where the U-shape cut-out or convex protrusion is provided on the exterior circumference. 16 is a motor. 17 is a rotary shaft thereof, on which the said rotating discs 13, 13', 14 and 14' are installed. 18, 19, 18' and 19' are electromagnetic pickups, each of which comprises a permanent magnet and a detecting coil as illustrated in FIG. 1. The electromagnetic pickups 18 and 19 installed adjacent to the rotating discs 13 and 14 are fixed, for example, on the housing of the motor 16 through a common supporting arm. The electromagnetic pickups 18' and 19' placed adjacent to the rotating discs 13' and 14' are installed on a rotary shaft 20 by means of a common supporting arm. The rotary shaft 20 has the same center as that of the rotary shaft 17 of the motor 16 but can rotate without regard to the rotary shaft 17.

Figure 5:
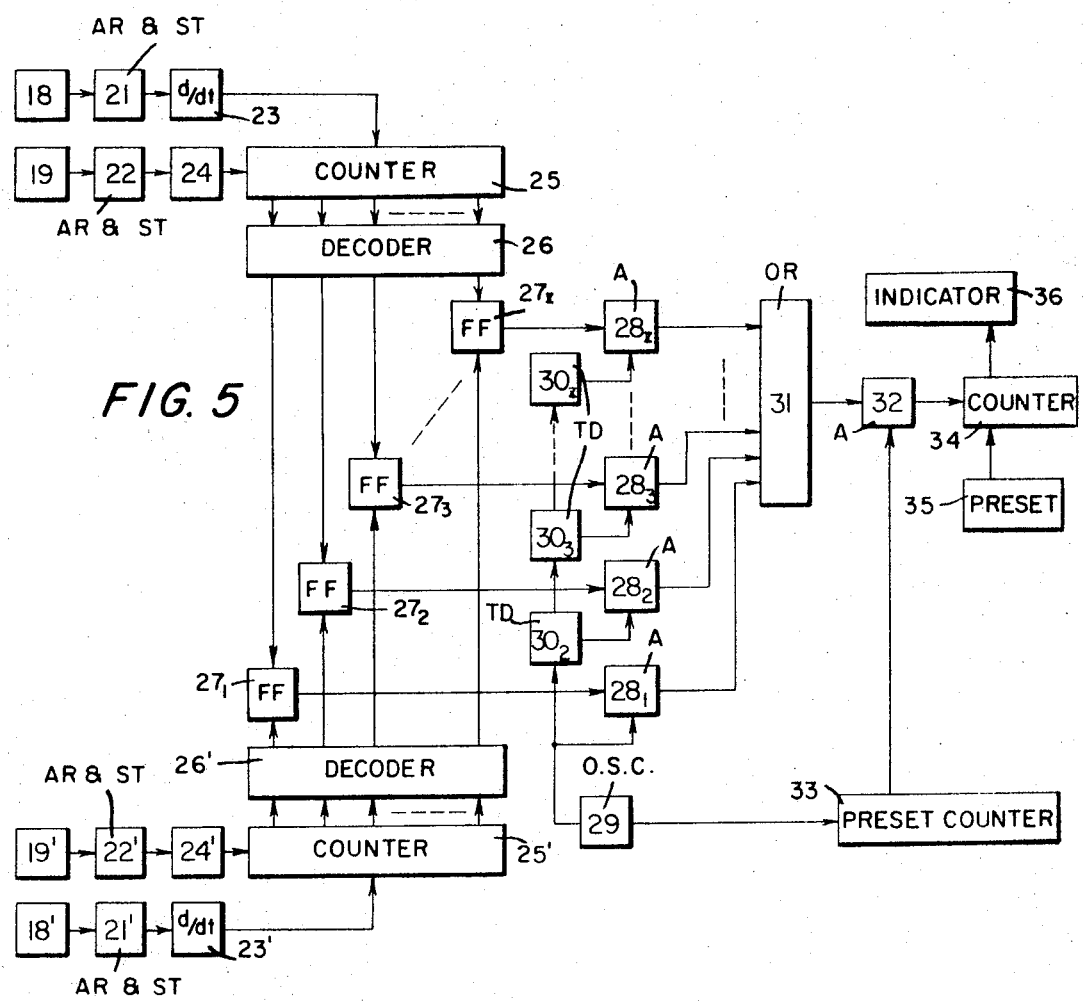
FIG. 5 illustrates in block form an example of the circuit for processing the detecting signals according to the invention.

Referring now to FIG. 5, there is illustrated in block form an example of the circuit for processing detection signals according to the invention. In the drawing, 18, 19, 18' and 19' are electromagnetic pickups as shown in FIG. 3; 21, 22, 21' and 22' are waveform shaping circuits; 23, 24, 23' and 24' are differentiation circuits; 25 and 25' are counters; 26 and 26' are decoders; $27_1$ through $27_z$ are flip-flop circuits; $28_1$ through $28_z$ are gate circuits; 29 is a reference pulse oscillator; $30_2$ through $30_z$ are delay circuits; 31 is an "or" gate circuit; 32 is a gate circuit, 33 is a preset counter; 34 is a counter; 35 is a device for setting the initial counting value of the counter 34; and 36 is an indicator. The flip-flop circuits $27_1$ through $27_z$ and the gate circuits $28_1$ through $28_z$ accord with the number of toothed protuberances provided on the exterior circumference of each of the rotating discs 13 and 13' shown in FIG. 3, and the delay circuits $30_2$ through $30_Z$ are installed to match the gate circuits $28_2$ through $28_Z$ respectively.

For the sake of convenient description, mention will be made hereinafter of the case in which the number of toothed protuberances provided on the exterior circumference of each of the rotating discs 13 and 13' is eight pieces and therefore the number of flip-flop circuits $27_1$ through $27_Z$ and that of the gate circuits $28_1$ through $28_Z$ are 8 pieces respectively, i.e., Z-8, and the number of the delay circuits $30_2$ through $30_Z$ is seven pieces (Z=8).

When turning the rotating discs 13, 14, 13' and 14' at a constant angular velocity with the motor 16, an AC signal having a constant phase difference of the same frequency and a waveform of either a square or sine wave depending on the shape of the toothed protuberances on the exterior circumference of each of the rotating discs 13 and 13' can be obtained from each of the electromagnetic pickups 18 and 18' as shown in FIGS. 6a and 6a'. The pulse signal can be taken out of the electromagnetic pickups 19 and 19' at the ratio of one pulse to one turn of the rotating discs 14 and 14 as shown in FIGS. 6b and 6b'. The output signals taken out of each of the electromagnetic pickups 18, 18', 19 and 19' are individually wave-form shaped with the wave-form shaping circuits 21, 22, 21' and 22', differentiated with the differentiation circuits 23, 24, 23' and 24' and then, for example, positive pulse signals only are taken out of the differentiated signals. Thus, the pulse train signals as shown in FIGS. 6c and 6c' are obtained from the differentiation circuits 23 and 23'. The repetition frequencies of these pulse train signals are determined by the number of revolutions of the motor 16 as well as that of the toothed protuberances on the exterior circumference of each of the rotating discs 13 and 13'. Also, the phase difference of these pulse train signals is determined by the mutual positioning relationship between the electromagnetic pickups 18 and 18' around the rotary shaft 17 of the motor 16. The relationship between the repetition frequencies and the phase difference of these pulse train signals is the same as that obtained from the conventional apparatus as shown in FIG. 1. As shown in FIGS. 6d and 6d', pulse signals are taken out of the differentiation circuits 24 and 24' at the ratio of one pulse per turn of each of the rotating discs 14 and 14'. The output pulse train signals (as shown in FIGS. 6c and 6c') of the differentiation circuits 23 and 23' are supplied to the counters 25 and 25' respectively as their counting input signals. Also, the output pulse signals (as shown in FIGS. 6d and 6d') of the differentiation circuits 24 and 24' are supplied to the counters 25 and 25' respectively as their reset signals.

When decoding the computation of the counter 25 with the decoder 26, the output signal of the decoder which matches the input pulse signal firstly counted with the counter 25 after it was reset is always fed to the flip-flop circuit $27_1$ and the output signal of the decoder 26 matching the second counter input pulse signal is always supplied to the flip-flop circuit $27_2$. Likely, the output signal from the decoder 26 is fed to the flip-flop circuit 27 in sequent. Therefore, this results in as if each pulse of the pulse train signal (as shown in FIG. 6c) taken out of the differentiation circuit 23 was given its respective peculiar number indication as order based on the pulse signal (in FIG. 6d) delivered by the differentiation circuit 24. Also, this results in as if each toothed protuberance on the rotating disc 13 matching each pulse signal was given its peculiar number indicating an order based on the cut-out 15 of the rotating disc 14. The same thing can be said for the counter 25' as well as the decoder 26'. Therefore, when setting the flip-flop circuit $27_1$ with the output signal from the decoder 26 and resetting it with the output signal from the decoder 26', such a gate control signal as shown in FIG. 6e' can be obtained from the flip-flop circuit 27. The make and break functions of the gate circuit $28_1$ are controlled with the gate control signal and the pulse signal from the reference pulse oscillator 29 is allowed to pass through the gate circuit $28_1$ while it is put into a make state. The pulse signal thus passing through the gate circuit $28_1$ is led to the counter 34 for computation through the gate circuit 32 controlled by the "or" gate circuit 31 and the preset counter 33. Thus, like the description made hereinbefore in relation to the formula (8), the phase difference of the output AC signals of the electromagnetic pickups 18 and 18' can be obtained from the computation of the counter 34. Also, by properly increasing or decreasing the initial counting value of the counter 34 beforehand with the setting device 35, only an increase of the phase difference compared to the initial setting value can be indicated on the indicator 36.

As described hereinbefore, in the apparatus according to the invention, the flip-flop circuit $27_1$ is set and reset by each output pulse signal (i.e., the signal matching each of the first pulse signals as shown in FIGS. 6c and 6c') of the decoders 26 and 26' and thereby the gate control signal (FIG. 6e') for the gate circuit $28_1$ is shaped. In the invention, therefore, the range of $\epsilon$ in the formula (8) can be expanded to within one turn of the rotary shaft 20 centering the rotary shaft 17 of the motor 16. For example, when the rotating angle of the rotary shaft 20 exceeds one pitch of the toothed protuberances on the rotating discs 13 and 13', the phase difference of the output pulse signals of the differentiation circuits 23 and 23' which match the output signals of the electromagnetic pickups 18 and 18' becomes greater than $2\pi + \theta$ greater than $2\pi$ in an electrical angle can not be discriminated from the phase difference $\theta$ less than $2\pi$ and therefore the phase difference $2\pi + \theta$ must be treated in the same way as for the phase difference $\theta$.

Whereas, in the invention, the gate control signal as shown in FIG. 6f' can be shaped by setting and resetting the flip-flop circuit $27_1$ with the output signals from the decoders 26 and 26' matching the first pulse signals as shown in FIGS. 6c and 6c'. Since the gate control signal $f_1$ is shaped at the ratio of one pulse to one turn of the rotating discs 13 and 13', the gate circuit $28_1$ can be controlled with the gate control signal and thus the phase difference of the output signals of the electromagnetic pickups 18 and 18' can be measured by counting the number of pulse signals from the reference pulse oscillator 29 which pass through the gate circuit $28_1$ while it is put into a make state. That is, in the invention, the detection of the phase difference greater than $2\pi$ in an electrical angle, i.e., in general $2\pi + \theta$, $4\pi + \theta$ and so on, can be achieved by discriminating it from the phase difference $\theta$ less than $2\pi$, and thus any phase difference matching an arbitrary rotating angle can be measured provided the rotating angle of the rotary shaft 20 is less than $2\pi$ in a mechanical angle. Therefore, the measuring angle range can be widened extremely when compared with the conventional apparatus.

In the invention, the reference pulse signals passing through the gate circuit $28_1$ are added again to the counter 34 through the gate circuit 32. This is, as described and illustrated in FIG. 2, to eliminate errors caused by the variation in the same number of revolutions of the motor 16 and the mechanical unevenness of the toothed protuberances of the rotating discs 13 and 13'. However, there is still a possibility of causing measuring errors because of the timing between the control signal delivered from the preset counter 33 for controlling the gate circuit 32 and the pulse train group supplied to the said gate circuit 32.

Figure 7:
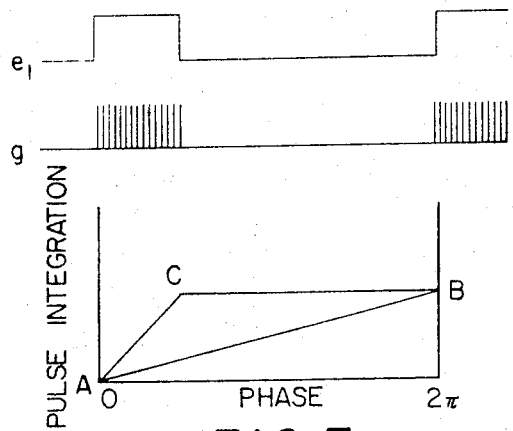

FIGS. 7 through 10 are for explaining such errors in more detail. Referring now to FIG. 7, $e_1$ is a control signal for the gate circuit $28_1$ and g is a reference pulse signal having passed through the gate circuit $28_1$. Suppose that the reference pulse signals g having passed through the gate circuit $28_1$ are distributed evenly between phase 0 and $2\pi$, the integration of the pulse signals on the counter 34 is increased equally like $a \rightarrow B$. Actually, however, like g the pulse signals exist only within a range matching the duration of the conductance of the gate circuit $28_1$ and do not exist during the gate circuit $28_1$ is put into a break state. In other words, the distribution of the reference pulse signals is deflected. Because of this, the integration of the counter 34 becomes non-linear like $A \rightarrow C \rightarrow B$. As already mentioned, the reference pulse signals passing through the gate circuit $28_1$ are fed to the gate circuit 32 through the "or" gate circuit 31.

Figure 8:
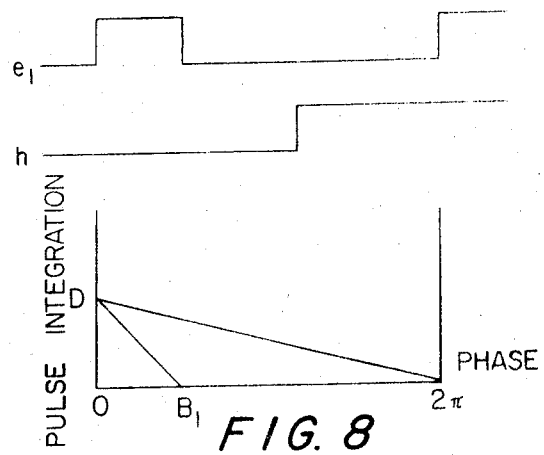

As shown in FIG. 8, the rising phase of a make and break control signal h for the gate circuit 32, i.e., the conduction starting phase of the gate circuit 32, exists in the phase between 0 and $2\pi$ of the make and break control signal $e_1$ for the gate circuit $28_1$. Therefore, if the gate circuit 32 is put into a conducting state at a phase of 0, the pulse integration reaches a D point. If the gate circuit is put into a conducting state between phase $\theta$ and $2\pi$, the pulse integration will be 0. Therefore, the relationship between the conduction starting phase of the gate circuit 32 and the pulse integration is $D \rightarrow \theta 1 \rightarrow 2\pi$.

Assuming that the reference pulse signals (FIG. 7 g) matching the phase difference of the output signals of the electromagnetic pickups 18 and 18' can be distributed evenly between 0 and $2\pi$ as already mentioned, the relationship between the conduction starting phase of the gate circuit 32 and the pulse integration will be an ideal linear characteristic like $D \rightarrow 2\pi$ as shown in FIG. 8. Thus, a difference between a linear characteristic of $D \rightarrow 2\pi$ and a non-linear one of $D \rightarrow \theta 1 \rightarrow 2\pi$ is the measuring error. The measuring error becomes maximum when the phase difference is $\pi$. The magnitude of the measuring error is equal to the number of pulses counted in one cycle whereas the time width of the control signal $e_1$ is one-fourth of a cycle and the gate circuit $28_1$ is put into a break state during the width. And, when fixing our eyes upon the conduction starting phase only of the gate circuit 32, the measuring error is always at the negative side as can be seen by FIG. 8.

Figure 9:
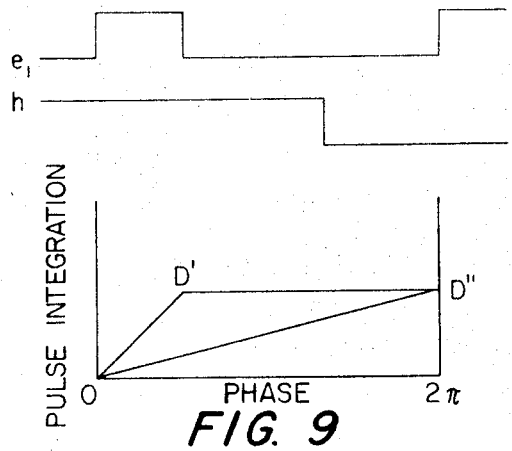

Illustrated in FIG. 9 are the relationship between the rising phase of the control signal h for the gate 32, i.e., the break phase of the gate circuit 32, and the make and break control signal $e_1$ of the gate circuit $28_1$, and that between the break phase of the gate circuit 32 and the pulse integration. In the drawing, $0 \rightarrow D''$ is an ideal characteristic and $0 \rightarrow D' \rightarrow D''$ is an actual characteristic. And, the measuring error when gate circuit 32 is put into a break state is always at the positive side. That is, the maximum at a time when the gate circuit 32 is put into a make state and the maximum error when it is put into a break state are equal to each other in an absolute value but their polarity is opposite to each other. The error decreases in reciprocal proportion as the number of pulse signal groups (FIG. 7 g) passing through the gate circuit 32 increases, i.e., as the rising and falling time width of the control signal h becomes longer than the cycle of the control signal $e_1$. However, in case of measuring such a great rotating angle as being close to one turn of the rotary shaft 20 (FIG. 3), it is necessary to make the conducting time of the gate circuit 32 extremely long in order to increase the measuring accuracy while decreasing the measuring error since the one cycle of the gate control signal $e_1$ is corresponding to almost one turn of the rotating discs 13 and 13'. The apparatus according to the invention, however, is so constructed that the measuring accuracy can be increased without making the conducting time of the gate circuit 32 extremely long.

Figure 6:
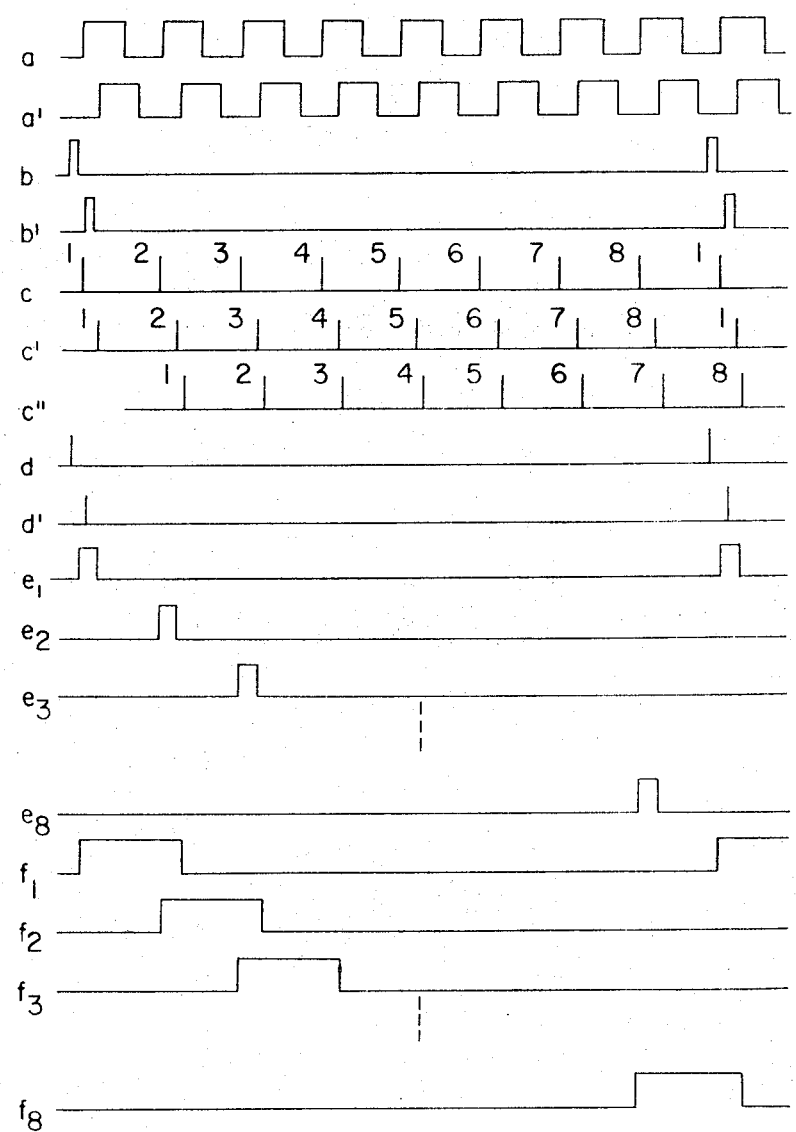
FIG. 6 illustrates a wave form for explaining the theory of operation according to the invention; and, FIGS. 7 through 10 illustrate the drawings explaining measuring measuring errors of the apparatus according to the invention respectively.

As already mentioned, the apparatus according to the invention is so constructed that the same result as having provided each pulse signal of the output pulse trains (FIGS. 6 c and 6 c') of the differentiation circuits 23 and 23' with its peculiar number in due order can be obtained from it. Because of this, polyphase gate control signals can be shaped. That is, the gate control signal (FIG. 6 $e_1$) is shaped by supplying the output signals of the decoders 26 and 26' matching the first pulse signals as shown in FIGS. 6 c and 6 c' to the flip-flop circuit $27_1$, the gate control signal (FIG. 6 $e_2$) is formed by supplying the output signals of the decoders 26 and 26' matching the second pulse signals of the c and c' pulse trains to the flip-flop circuit $27_2$ and by repeating this in sequent until the output signals of the decoders 26 and 26' matching the eighth pulse signals of the c and c' pulse trains are fed to the flip-flop circuit $27_8$, the gate control signal (FIG. 6 $e_8$) is shaped.

These polyphase gate control signals $e_1$ through $e_8$ are fed in due order to the gate circuit $28_1$ through $28_8$ to put them into a conducting state in the order and the reference pulse signals having passed through each of the gate circuits are fed to the counter 34 through the "or" gate circuit 31 and the gate circuit 32.

Figure 10:
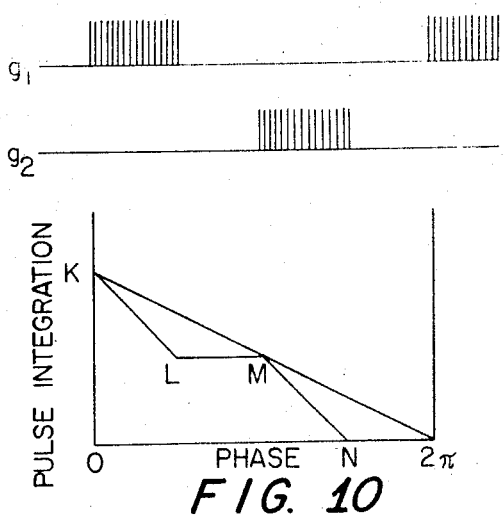

Now, mention is made of an error by referring to an example that two gate control signals $e_1$ and $e_2$ are shaped in one cycle from 0 to $2\pi$ and two pulse train groups having passed through the gate circuits $28_1$ and $28_2$ are counted. In FIG. 10, $g_1$ is a pulse group having passed through the gate circuit $28_1$; $g_2$ is a pulse group having passed through the gate circuit $28_2$; $K \rightarrow L \rightarrow M \rightarrow 2\pi$ is a characteristic obtained from the actual counting of the pulse groups $g_1$ and $g_2$ and $K \rightarrow 2\pi$ is an ideal characteristic. The error is the difference between the actual counted characteristic and the ideal one. The error becomes maximum when the phase difference is $\pi/2$. The magnitude is one-fourth of that illustrated and described in FIGS. 8 and 9. Thus, the error can be decreased to $1/_22$ by shaping two pulse groups by making sampling twice in one cycle from 0 to $2\pi$ when compared with a single sampling. Generally speaking, the maximum error can be decreased to $1/_n2$ by carrying out sampling $n$ times between $\theta$ and $2\pi$ when compared with a single sampling.

Description has been made based on an example that the number of toothed protuberances of each of the rotating discs 13 and 13' is eight pieces. By this, sampling can be performed eight times every time the rotating disc is given a turn. Because of this, the error in the gate circuit 32 can be decreased to one sixty-fourth when compared with a single sampling by arbitrary pulse. And, the maximum error is caused when the phase difference $c$ and $c'$ or $c$ and $c''$ in FIG. 6 becomes $\pi$ relatively without regard to the peculiar order number given to each pulse. Thus, with the apparatus according to the invention, polyphase gate control signals are shaped, multiple sampling is achieved between 0 and $2\pi$ and thereby measurements of an extremely wider angle can be made with high accuracy while keeping the same conducting time of the gate circuit 32 as before.

As can be seen by FIG. 6, the gate control signals $e_1$ through $e_8$ formed from the pulse trains $c$ and $c'$ have their respective different phase and are not repeated. Because of this, the pulses having passed through the gate circuits $28_1$ through $28_8$ are not repeated and therefore there is no possibility of causing any counting error. When a phase difference is greater than $2\pi$ like the case of the pulse trains $c$ and $c'$ in FIG. 6, however, the part of the gate control signals is repeated, for example, like $f_1$ and $f_2$ and therefore the part of pulses passing through the gate circuits $28_1$ and $28_2$ is repeated, causing a counting error to occur. In this case, the error can be eliminated by selecting properly each delay time of the delay circuits $30_2$ through $30_z$ and giving time lag to the pulse group passing through each of the gate circuits $28_1$ through $28_z$.

Mention has been made hereinbefore on the case in which the gate control signals are shaped by making use of the positive pulse signals of the output differentiated pulse signals of the differentiation circuits 23 and 23' as shown in FIG. 3. Of course, the gate control signals can be formed by making use of the negative pulse signals only or both the positive and negative pulse signals. In case of using both of them, the number of sampling becomes double when compared with the case in which either one of them is used, and thus the maximum error is improved up to one-fourth.

The foregoing is a detailed description on the invention. The invention can be embodied even if the following modifications are made:

1. The reference pulse can be designed to be shaped with a purely electrical pulse oscillator in place of the rotating discs 14 and 14' and the electromagnetic pickups 19 and 19', and the pulse signals matching the output signals of the electromagnetic pickups 18 and 18', i.e., the output pulse signals of the differentiation circuits 23 and 23', are given their respective peculiar numbers in due order.

2. The counters 25 and 25' can be formed with ring counters or shift registers, to either one of which the output pulse signals of the differentiation circuits 23 and 23' are fed for ordering, instead of putting numbers in due order to the output pulse signals of the differentiation circuits 23 and 23' with the reference pulse signals.

3. The "or" gate circuit 31 can be formed with a circuit having an adding capability. Thus, even if part of the pulse signals from the gate circuits $28_1$ through $28_z$ are repeated, it can be permitted, making the delay circuits $30_2$ through $30_z$ unnecessary.

4. In the previous example, the reference pulse signal for ranking the output pulse signals of the differentiation circuits 23 and 23' is produced at the ratio of one pulse to one turn of the rotating discs 14 and 14' and thus the angle measuring range is from 0 to $2\pi$. This can be changed so that the plural number of reference pulse signals is produced per turn of the rotating discs 14 and 14' and at the same time the angle measuring range can be reduced less than $2\pi$ in a mechanical angle.

5. By dividing the output signals of the electromagnetic pickups 19 and 19', the reference pulse signal for ranking the output pulse signals of the differentiation circuits 23 and 23' can be produced at the ratio of one pulse to $n$ turns of the rotating discs 14 and 14' and thus the angle measuring range can be expanded up to $2\pi n$ (in a mechanical angle).

6. In the case where the conters 25 and 25' are formed with ring counters or shift registers to rank the output pulse signals of the differentiation circuits 23 and 23' as described in the item (2) above, the angle measuring range can be expanded by increasing the number of steps of the ring counters or shift registers.

7. To produce AC signals, a photoelectric pulse oscillator formed by placing a light source and a photoelectric converter facing each other between a rotating disc of an opaque material having a radial slit can be used instead of using the rotating discs 13, 13', 14 and 14' and the electromagnetic pickups 18, 18', 19 and 19'.

I claim:

1. An angle measuring apparatus comprising first and second rotating discs of a magnetic material having the same number of toothed protuberances on their respective exterior circumferences;

third and fourth rotating discs of magnetic or non-magnetic material having a single or the same number of U-shape cut-outs, convex protrusions for small magnetic pieces on their respective exterior circumferences;

a motor driveable connected to at least the said first rotating disc to turn about a common axis;

first and third electromagnetic pickups fixed facing each of the exterior circumferences of the said first and third rotating discs;

a rotary shaft having the same center as that of the common rotary axis for the said at least first rotating disc but being able to turn in accordance with the rotating angle of an object being measured without regard to the said common rotary axis;

second and fourth electromagnetic pickups being able to move along the exterior circumference of each of the said second and fourth rotating discs in accordance with the revolution of the said rotary axis;

a circuit for shaping pulse signals having repetition frequency and phase matching each of the AC output signals of the said first and fourth electromagnetic pickups;

a first counter using the pulse signal matching the output of the said first electromagnetic pickup as its counting input signal and the pulse signal matching the output of the said third electromagnetic pickup or its divided signal as a reset signal respectively;

a second counter utilizing the pulse signal matching the output of the said second electromagnetic pickup as its counting input signal and the pulse signal matching the output of the said fourth electromagnetic pickup or its divided signal as a reset signal respectively;

first and second decoders for decoding individually the computation of the said first and second counters, a flip-flop circuit set and reset with a set of arbitrary, matching output signals of the output signals of the said first and second decoders;

a gate circuit controlled by the output signals of the said flip-flop circuit;

a reference pulse oscillator for producing and delivering reference pulse signals to the said gate circuit;

and a counter counting the pulse signals passing through the said gate circuit.

2. An angle measuring apparatus comprising first and second rotating discs of a magnetic material having the same number of toothed protuberances on their respective exterior circumferences;

third and fourth rotating discs of a magnetic, or non-magnetic material having a single or the same number of U-shape cut-outs or convex protrusions or small magnetic pieces on their respective exterior circumferences;

a motor causing the said first and fourth rotating disc to turn around a common shaft;

first and third electromagnetic pickups fixed facing each of the exterior circumferences of the said first and third rotating discs;

a rotary shaft having the same center as that of the common rotary shaft for the said first and fourth rotating disc but being able to turn in accordance with the rotating angle of an object being measured without regard to the said common rotary shaft;

second and fourth electromagnetic pickups being able to move along the exterior circumference of each of the said second and fourth rotating discs in accordance with the revolution of the said rotary shaft;

a circuit for shaping pulse signals having repetition frequency and phase matching each of the AC output signals of the said first and fourth electromagnetic pickups;

a first counter using the pulse signal matching the output of the said first electromagnetic pickup as its counting input signal and the pulse matching the output of the said third electromagnetic pickup or its divided signal as a reset signal respectively;

a second counter utilizing the pulse signal matching the output of the said second electromagnetic pickup as its counting input signal and the pulse signal matching the output of the said fourth electromagnetic pickup or its divided signal as a reset signal respectively;

first and second decoders for decoding individually the computation of the said first and second counters;

a flip-flop circuit for each toothed protuberance on the exterior circumference of each of the said first and second rotating discs individually set and reset with each set of matching output signals of the said first and second decoders;

plural gate circuits corresponding in number to the said flip-flop circuits and controlled with the output signals therefrom;

a reference pulse oscillator for producing and distributing the reference pulse signals to these gate circuits;

delay circuits for varying the phase of each of the reference pulse signals distributed to each gate circuit;

an "or" gate circuit for composing waves of the reference pulse signals having passed through each of the said gate circuits;

a gate circuit installed at the output side of the said "or" gate circuit and put into a conducting state in an extremely long time width when compared with the period of the output signals of the said third and fourth electromagnetic pickups;

and a counter for counting the number of pulse signals passing through the said gate circuit.

3. An angle measuring apparatus comprising first and second rotating discs of a magnetic material having the same number of toothed protuberances on their respective exterior circumferences;

a motor causing the said first and second rotating discs to turn around a common shaft;

first electromagnetic pickup fixed facing the exterior circumference of the said first rotating disc;

a rotary shaft having the same center as that of the common rotary shaft for the said first and second rotating discs and being able to turn in accordance with the rotating angle of an object being measured without regard to the said common rotary shaft;

second electromagnetic pickup being able to move along the exterior circumference of the said second rotating disc in accordance with the revolution of the said rotary shaft;

a circuit for shaping pulse signals having repetition frequency and phase matching each of the AC output signals of the said first and second electromagnetic pickups;

first and second ring counters utilizing individually the pulse signals of two systems matching the output of each of the said first and second electromagnetic pickups as their counting input and each said counters having the same number of steps;

first and second decoders for decoding individually the computation of the first and second ring counters, at least one flip-flop circuit set and reset with at least one set of output signals matching the first and second decoders, at least one gate circuit installed for the said flip-flop circuit and controlled with the output signals of the said flip-flop circuit;

a reference pulse oscillator for producing and delivering reference pulse signals to the said gate circuit;

and a counter for counting the number of pulse signals passing through the said gate circuit.

4. An angle measuring apparatus comprising first and second rotating discs of an opaque material having the same number of slits in a radius direction;

the third and fourth rotating discs of a opaque material having the same plural number of slits in a radius direction;

a motor causing at least the said first rotating disc to turn around a common rotary shaft;

first light source and photoelectric converter fixed facing each other between the at least said first rotating disc;
a gate circuit;
third light source and photoelectric converter and means delivering the reference pulse signals from said converters to the said gate circuit, and a counter for counting the number of pulse signals passing through the said gate circuit.

* * * * *